US008624558B2

(12) United States Patent
Bianciotto et al.

(10) Patent No.: US 8,624,558 B2
(45) Date of Patent: Jan. 7, 2014

(54) ELECTRICITY SUPPLY APPARATUS OF AN INDUSTRIAL SITE

(75) Inventors: Elio Bianciotto, Turin (IT); Claudio Bianco, Turin (IT); Flavio Cucchietti, Turin (IT); Gianluca Griffa, Turin (IT)

(73) Assignee: Telecom Italia S.p.A., Milan (IT)

( * ) Notice: Subject to any disclaimer, the term of this patent is extended or adjusted under 35 U.S.C. 154(b) by 601 days.

(21) Appl. No.: 12/745,346

(22) PCT Filed: Nov. 30, 2007

(86) PCT No.: PCT/EP2007/063091
§ 371 (c)(1),
(2), (4) Date: Oct. 4, 2010

(87) PCT Pub. No.: WO2009/068112
PCT Pub. Date: Jun. 4, 2009

(65) Prior Publication Data
US 2011/0018502 A1    Jan. 27, 2011

(51) Int. Cl.
*H02J 7/04*    (2006.01)
*H02J 7/16*    (2006.01)

(52) U.S. Cl.
USPC .......................................................... 320/162

(58) Field of Classification Search
USPC .......................................................... 320/162
See application file for complete search history.

(56) References Cited

U.S. PATENT DOCUMENTS

| 5,548,200 | A | * | 8/1996 | Nor et al. ....................... 320/109 |
| 5,696,367 | A | * | 12/1997 | Keith .............................. 235/381 |
| 6,034,507 | A | | 3/2000 | Ikawa et al. |
| RE37,678 | E | | 4/2002 | Ikawa et al. |
| 6,380,715 | B1 | | 4/2002 | Kubo |
| 6,522,031 | B2 | | 2/2003 | Provanzana et al. |
| 6,885,115 | B2 | | 4/2005 | Hatori et al. |
| 2002/0051368 | A1 | | 5/2002 | Ulinski et al. |
| 2002/0140400 | A1 | | 10/2002 | Hatori et al. |
| 2003/0090236 | A1 | | 5/2003 | Odaohhara et al. |
| 2005/0134225 | A1 | | 6/2005 | Mese et al. |
| 2007/0035290 | A1 | | 2/2007 | Schweigert et al. |
| 2007/0277031 | A1 | * | 11/2007 | Ginter et al. ................... 713/155 |
| 2009/0030712 | A1 | * | 1/2009 | Bogolea et al. ................... 705/1 |

FOREIGN PATENT DOCUMENTS

WO    WO-2007/104167 A1    9/2007

OTHER PUBLICATIONS

Grossoni et al., "Some Special Devices Used in the New Type of Power Plants for the Italian Telecommunication Systems," Proceedings of the 2$^{nd}$ International Telecommunications Energy Conference (INTELEC), pp. 1-4, (1979).
International Search Report from the European Patent Office for International Application No. PCT/EP2007/063091 (Mail date Sep. 8, 2008).

* cited by examiner

*Primary Examiner* — Arun Williams
(74) *Attorney, Agent, or Firm* — Finnegan, Henderson, Farabow, Garrett & Dunner, L.L.P.

(57) ABSTRACT

An electricity supply apparatus includes a control device configured to calculate an amplitude of a control signal and to generate the control signal; an energy station configured to draw a current from a mains, to provide part of the drawn current to the load, to receive the control signal from the control device, and to vary the drawn current according to the amplitude; and a battery configured to recharge by drawing part of the drawn current and to discharge by supplying the load. The apparatus is characterized in that the control device is further configured to calculate the amplitude of the control signal also according to battery information relating to a recharge and/or a discharge condition of the battery.

25 Claims, 7 Drawing Sheets

ELECTRICITY SUPPLY APPARATUS OF AN INDUSTRIAL SITE

CROSS REFERENCE TO RELATED APPLICATION

This application is a national phase application based on PCT/EP2007/063091, filed Nov. 30, 2007, the content of which is incorporated herein by reference.

TECHNICAL FIELD

The present invention relates to the field of electricity supply apparatuses. In particular, the present invention relates to an electricity supply apparatus of an industrial site, in particular (but not exclusively) a telecommunication site. Further, the present invention relates to a method for supplying such an industrial site.

BACKGROUND ART

A telecommunication network typically comprises a plurality of telecommunication sites distributed over the coverage area of the telecommunication network. Typically, each telecommunication site comprises a plurality of electrical and electronic apparatuses, such as:

telecommunication apparatuses (e.g. switches, routers, etc.);

auxiliary apparatuses which perform functions allowing the telecommunication apparatuses to operate (e.g. cable pressurizers, conditioners for keeping constant the temperature of the telecommunication apparatuses, etc.); and other electrical apparatuses (e.g. air conditioners and heating systems for the offices, elevators, computers, lighting systems, etc.).

The telecommunication apparatuses typically have a substantially constant electricity consumption, they require to be supplied with a DC current at a nominal voltage of 48 V, and their electricity supply can not undergo interruptions longer than few tens of milliseconds. On the other hand, auxiliary apparatuses and the other electrical apparatuses have an electricity consumption which significantly varies according to the seasons, the day of the week (either working day or holiday), and the time of the day.

Each telecommunication site is typically supplied by an electricity supply apparatus.

An electricity supply apparatus typically comprises a mains-generator switch, an energy station and one or more batteries. The mains-generator switch has two input lines which are connected to a mains and, optionally, to a generator, respectively, and an output line. The mains-generator switch is switchable between a normal operational status, wherein it draws an AC current from the mains, and a failure status (e.g. when a black-out occurs in the mains), wherein it can draw an AC current from the generator. The mains-generator switch then outputs the drawn AC current through its output line, which distributes it to the apparatuses of the telecommunication site.

In particular, the AC current is distributed partially to the energy station and partially to the auxiliary apparatuses and the other electrical apparatuses. The energy station, which substantially comprises a number of rectifiers, converts the AC current in a DC current at a nominal voltage of 48 V. The conversion performed by the energy station typically implies a conversion loss. However, for simplicity, in the following description it is assumed that the conversion efficiency of the energy station is substantially equal to 1, i.e. the conversion loss is substantially negligible.

In a first status, either the mains or the generator are able to supply a theoretically unlimited amount of current. If the batteries are substantially fully charged, the whole current supplied by the energy station is absorbed by the telecommunication apparatuses. If the batteries are only partially charged, the current supplied by the energy station is absorbed partially by the telecommunication apparatuses and partially by the batteries, which then recharge. In any case, in this first status, the amount of current that the energy station draws from the mains (or the generator) through the mains-generator switch only depends on the current absorbed by the loads (i.e. the telecommunication apparatuses and, if only partially charged, the batteries).

In a second status, e.g. due to a failure or a black-out, both the mains and the generator are able to supply a limited amount of current which is lower than the current required by the telecommunication apparatuses. In some cases, neither the mains nor the generator are able to provide any current at all. In this second status, the telecommunication apparatuses start to fully or partially draw the required current from the batteries, which then start to discharge.

The above described electricity supply apparatus may be used to supply not only a telecommunication site but, more generally, any industrial site having electrical and/or electronic apparatuses which, similarly to the above telecommunication apparatuses, have a substantially constant electricity consumption, require to be supplied with a DC current at a given nominal voltage, and whose electricity supply can not undergo interruptions longer than few tens of milliseconds.

Typically, the price of the electrical energy varies according to the day of the week and the time of the day. Therefore, the overall cost of the electrical energy drawn by an industrial site during a day is:

$$C = \sum_{i=1}^{24} pi * qi, \qquad [1]$$

wherein pi is the price per hour of the electrical energy during the $i^{th}$ hour of the day and qi is the amount of electrical energy drawn by the industrial site during the $i^{th}$ hour of the day. Typically, the price per hour of the electrical energy varies on a supply-demand basis, i.e. it is lower during the night (i.e. when the electrical energy demand is lower) and it is higher during the day (i.e. when the electrical energy demand is higher).

U.S. Pat. No. 6,885,115 discloses a system and a power supply control method capable of having a peak shift function without deteriorating the essential function of an apparatus. The power supply system comprises a secondary battery for supplying power to a load circuit, a power receiving unit for receiving power externally provided to the load circuit, a switch for selectively supplying the power of the secondary battery or the power externally provided to the load circuit, and a controller for instructing the switch to stop the supply of the power externally provided to the load circuit for a predetermined time zone. By using the second battery, which is capable of storing the electric energy to the extent to show the essential function, it is possible to add the peak shift function to an apparatus. More specifically, by typically stopping or reducing power supply from a commercial power source while receiving the power necessary for operations of an apparatus from a built in battery, it is possible to realize peak shift.

U.S. Pat. No. 6,522,031 discloses a large scale, capacitor-based electrical energy storage and distribution system capable of effectuating load-levelling during periods of peak demand on a utility. A capacitor or multitude of capacitors may be charged with electrical energy produced by the utility during periods of low demand, such as the evening hours, and discharged during periods of high electrical energy consumption to help reduce demand on the utility. One or more capacitors may be located at a consumer's residence or business for providing at least a portion of the consumer's electrical power requirements. Alternatively, a farm of capacitors may be provided at or near a utility, or at or near a location experiencing high demand, such that electrical energy stored in the capacitors can be discharged into the utility's distribution grid to increase the amount of electrical energy available for use.

The paper "Some special devices used in the new type of power plants for the Italian telecommunications systems", by M. Grossoni and F. Molinari, Proceedings of the $2^{nd}$ International Telecommunications Energy Conference (INTELEC) 1979, discloses a technique which is termed "external limitation". According to the external limitation technique, the rectifiers of the energy station are provided with a device that, on the basis of a remote control, controls the limitation of the output current of the rectifiers in order to avoid possible overloads of the generator.

SUMMARY OF THE INVENTION

The Applicant has noticed that the above solutions disadvantageously do not allow to optimise the batteries usage.

In particular, the above solutions disadvantageously could damage the batteries, since the conditions according to which discharge and recharge operations are performed (i.e. the recharge current, the discharge current, the minimum charge level and the maximum charge level) are determined only according to a peak shift function (in U.S. Pat. No. 6,885,115) or a function effectuating load-levelling during periods of peak demand on a utility (in U.S. Pat. No. 6,522,031). In addition, the above solutions do not allow to maximize the energy storage efficiency of the batteries.

Accordingly, the Applicant has tackled the problem of providing an electricity supply apparatus of an industrial site (in particular, but not exclusively, a telecommunication site), which allows to minimize the amount of current drawn from the mains when the price per hour of the electrical energy is higher by using batteries, which batteries are then recharged when the price per hour of the electrical energy is lower, while optimising the batteries usage (in particular, by minimizing the risk of damaging the batteries and maximizing the energy storage efficiency of the batteries).

The Applicant has perceived that the above known external limitation technique may be applied to the above disclosed electricity supply apparatus for regulating the current drawn by the energy station so that the amount of current drawn from the mains when the price per hour of the electrical energy is higher is minimized and, at the same time, the batteries usage is optimised.

According to a first aspect, the present invention provides an electricity supply apparatus of an industrial site comprising a load, the electricity supply apparatus comprising:
 a control device configured to calculate an amplitude of a control signal according to a price information indicative of a price per time unit of a first current drawn from a mains and to generate the control signal;
 an energy station configured to draw the first current from the mains, to provide at least a first part of the first current to the load, to receive the control signal from the control device, and to vary the first current according to the amplitude of the control signal; and
 a battery electrically connected to the energy station and to the load, the battery being configured to recharge by drawing a second part of the first current from the energy station and to discharge by providing a second current to the load, the apparatus being characterized in that the control device is further configured to calculate the amplitude of the control signal also according to battery information relating to at least one of a recharge condition and a discharge condition of the battery, the amplitude having an intermediate value of a range delimited by a minimum value and a maximum value.

Preferably, the price information comprise a price table, the price table comprising a number of rows, each of the number of rows comprising an hour of the day and a price per hour of the first current during the hour.

Preferably, the control device is further configured to classify each hour comprised in the price table as one of a peak hour, a neutral hour and an off-peak hour, according to the battery information.

Preferably, the battery information comprise an optimum charge level of the battery, a minimum charge level of the battery and an optimum discharge current of the battery.

Preferably, the control device is configured to determine a first number N of peak hours as a number of hours required to discharge the battery from the optimum charge level to the minimum charge level with a discharge current equal to the optimum discharge current.

Preferably, the battery information further comprise an optimum recharge current of the battery.

Preferably, the control device is further configured to determine a second number M of off-peak hours as a number of hours required to recharge the battery from the minimum charge level to the optimum charge level with a recharge current equal to the optimum recharge current. Preferably, the second number M is a function of the day of the week.

Preferably, the control device is configured to determine a third number of neutral hours according to the formula: 24-N-M.

Profitably, the control device is configured to detect a present time and to determine whether the present time corresponds to a peak hour, or to an off-peak hour or to a neutral hour.

Preferably, the control device is further configured, if the present time corresponds to a neutral hour, to detect a present battery charge level, to determine whether the present battery charge level is equal to a maximum charge level of the battery, and:
 in the affirmative, to set the amplitude to the minimum value; and
 in the negative, to set the amplitude to a first intermediate value such that the first current is equal to a current requested by the load, the second part of the first current being equal to zero.

Preferably, the control device is further configured, if the present time corresponds to a peak hour, to detect the present battery charge level, to determine whether the present battery charge level is higher than the minimum battery charge level of the battery, and:
 in the affirmative, to set the amplitude to a second intermediate value such that the first current is equal to the current requested by the load decreased by the optimum discharge current of the battery, the battery being discharged with the second current equal to the optimum discharge current; and in the negative, to set the amplitude to a third intermediate value such that the first current is equal to the current requested by the load, the second current being equal to zero.

Preferably, the control device is further configured, if the present time corresponds to a off-peak hour, to detect the present battery charge level, to determine whether the present battery charge level is equal to the maximum battery charge level of the battery, and:
  in the affirmative, to set the amplitude to the minimum value; and
  in the negative, to set the amplitude to a fourth intermediate value such that the first current is equal to the current requested by the load increased by the optimum recharge current of the battery, the battery recharging with the second part of the first current equal to the optimum recharge current.

Preferably, the control device is further configured to:
detect whether it is receiving a load reduction signal;
in the affirmative, determine whether the present battery charge level is higher than the minimum battery charge level of the battery, and:
  in the affirmative, set the amplitude to one of the minimum value and a fifth intermediate value, such that the first current is reduced to a target value; and
  in the negative, activate a generator and instruct the energy station to start drawing the first current from the generator.

According to a second aspect, the present invention provides a method for supplying, by means of an energy station, an industrial site comprising a load, the method comprising:
a) at the energy station, drawing a first current from a mains by means of the energy station and providing at least part of the first current to the load;
b) at a control device, calculating an amplitude of a control signal according to a price information indicative of a price per time unit of the first current and providing the control signal to the energy station;
c) at the energy station, receiving the control signal and varying the first current according to the amplitude of the control signal; and
d) performing one of an operation of recharging a battery electrically connected to the energy station and to the load with a second part of the first current and an operation of discharging the battery by providing a second current to the load,
the method being characterized in that step b) comprises calculating the amplitude of the control signal also according to battery information relating to at least one of a recharge condition and a discharge condition of the battery, the amplitude having an intermediate value of a range delimited by a minimum value and a maximum value.

Preferably, the method further comprises, before step b), a step of receiving the price information in the form of a price table, the price table comprising a number of rows, each of the number of rows comprising an hour of the day and a price per hour of the first current during the hour.

Preferably, the method further comprises, before step b), a step of classifying each hour comprised in the price table as one of a peak hour, a neutral hour and an off-peak hour, according to the battery information.

Preferably, the method further comprises, before step b), a step of determining a first number N of peak hours as a number of hours required to discharge the battery from an optimum charge level to a minimum charge level with a discharge current equal to an optimum discharge current.

Preferably, the method further comprises, before step b), a step of determining a second number M of off-peak hours as a number of hours required to recharge the battery from the minimum charge level to the optimum charge level with a recharge current equal to an optimum recharge current.

Preferably, the method further comprises, before step b), a step of determining a third number of neutral hours according to the formula: 24-N-M.

Profitably, step b) comprises a step of detecting a present time and determining whether the present time corresponds to a peak hour, or to an off-peak hour or to a neutral hour.

Preferably, step b) comprises, if the present time corresponds to a neutral hour, a step of detecting a present battery charge level, determining whether the present battery charge level is equal to a maximum charge level of the battery, and:
  in the affirmative, setting the amplitude to the minimum value; and
  in the negative, setting the amplitude to a first intermediate value such that the first current is equal to a current requested by the load, the second part of the first current being equal to zero.

Preferably, step b) comprises, if the present time corresponds to a peak hour, a step of detecting the present battery charge level, determining whether the present battery charge level is higher than the minimum battery charge level of the battery, and:
  in the affirmative, setting the amplitude to a second intermediate value such that the first current is equal to the current requested by the load decreased by the optimum discharge current of the battery, the battery being discharged with the second current equal to the optimum discharge current; and
  in the negative, setting the amplitude to a third intermediate value such that the first current is equal to the current requested by the load, the second current being equal to zero.

Preferably, step b) comprises, if the present time corresponds to a off-peak hour, a step of detecting the present battery charge level, determining whether the present battery charge level is equal to the maximum battery charge level of the battery, and:
  in the affirmative, setting the amplitude to the minimum value; and
  in the negative, setting the amplitude to a fourth intermediate value such that the first current is equal to the current requested by the load increased by the optimum recharge current of the battery, the battery recharging with the second part of the first current equal to the optimum recharge current.

Preferably, step b) further comprises the following steps:
detecting whether a load reduction signal is received;
in the affirmative, determining whether the present battery charge level is higher than the minimum battery charge level of the battery, and:
  in the affirmative, setting the amplitude to one of the minimum value and a fifth intermediate value, such that the first current is reduced to a target value; and
  in the negative, activating a generator and instructing the energy station to start drawing the first current from the generator.

BRIEF DESCRIPTION OF THE DRAWINGS

The present invention will become clearer by reading the following detailed description, given by way of example and not of limitation, to be read with reference to the accompanying drawings, wherein.

DETAILED DESCRIPTION OF PREFERRED EMBODIMENTS OF THE INVENTION

Figure 1:
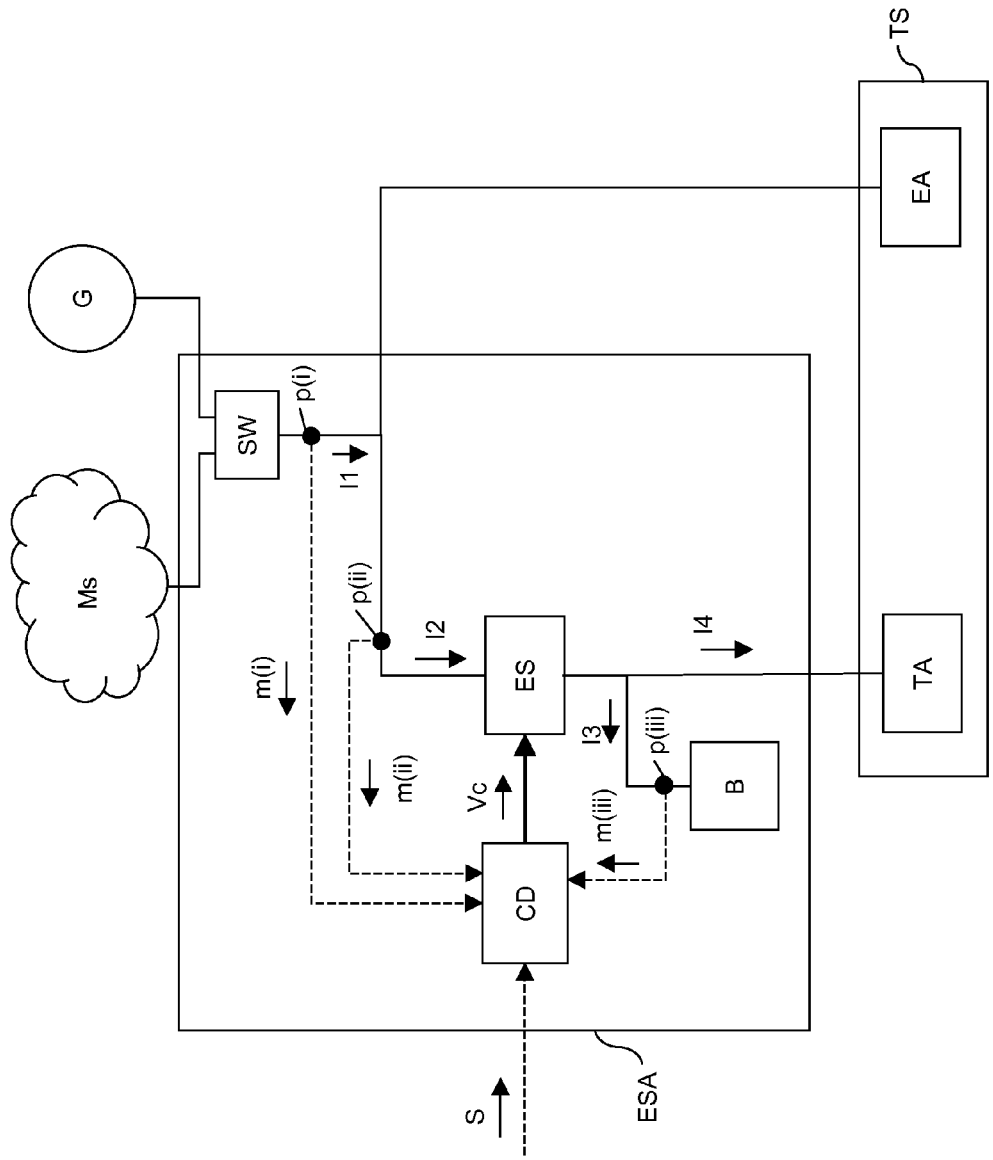
FIG. 1 schematically shows an electricity supply apparatus according to an embodiment of the present invention.

FIG. 1 schematically shows an electricity supply apparatus ESA for supplying electricity to an industrial site which comprises a load which requires to be supplied by an energy station.

By way of example, it is assumed that the industrial site is a telecommunication site TS comprising telecommunication apparatuses TA (i.e. the above load) and electrical apparatuses EA, in turn comprising auxiliary apparatuses which perform functions allowing the telecommunication apparatuses to operate and/or other electrical apparatuses (such as air conditioners and heating systems for the offices, elevators, computers, lightning system, etc.).

The electricity supply apparatus ESA preferably comprises a mains-generator switch SW, an energy station ES, a battery B, a control device CD and three probes p(i), p(ii) and p(iii). Even though FIG. 1 only shows a single battery B, the apparatus ESA may comprise any number of batteries, which are preferably connected the one to the other according to a parallel configuration.

The mains-generator SW has a first input line connected to a mains Ms and a second input line connected to a generator G. Further, the mains-generator switch SW has an output line which is connected both to the energy station ES and to the electrical apparatuses EA. The energy station ES in turn has an output line. The battery B and the telecommunication apparatuses TA are connected to the output line of the energy station ES according to a parallel configuration.

In FIG. 1, the current supplied by the mains-generator switch SW through the output line (i.e. the overall current drawn by the telecommunication site TS) is indicated as I1, the current drawn by the energy station ES is indicated as I2, the current absorbed by the battery B is indicated as I3 and the current absorbed by the telecommunication apparatuses is indicated as I4. For simplicity, it is assumed that the conversion efficiency of the energy station ES is substantially equal to 1, i.e. I2=I3+I4. Further, it is assumed that when the current I3 has negative values, it indicates a current flowing in a direction opposite to that indicated by the arrow I3 of FIG. 1, i.e. it indicates a current supplied by the battery B.

Preferably, the probe p(i) is placed on the output line of the mains-generator switch SW, and it is suitable to provide a measurement m(i) of the current I1 and/or of a further parameter associated to the current I1 and to provide the measurement m(i) to the control device CD. Preferably, the further parameter is the active power that the telecommunication site TS draws from the mains Ms or the generator G. Preferably, the probe p(i) provides the measurement m(i) in a continuous way or in a periodic way.

Preferably, the probe p(ii) is placed on the input line of the energy station ES, and it is suitable to provide a measurement m(ii) of the current I2 and/or of a further parameter associated to the current I2 and to provide the measurement m(ii) to the control device CD. Preferably, the further parameter is the voltage of the current I2. Preferably, the probe p(ii) provides the measurement m(ii) in a continuous way or in a periodic way.

Preferably, the probe p(iii) is placed on the line connecting the battery B to the energy station ES and to the telecommunication apparatuses TA, and it is suitable to provide a measurement m(iii) of the current I3 and to provide the measurement m(iii) to the control device CD. Preferably, the probe p(iii) provides the measurement m(iii) in a continuous way or a periodic way.

Optionally, the electricity supply apparatus ESA may also comprise a fourth probe (which is not shown in FIG. 1) located at the input of the telecommunication apparatuses TA, which is suitable to provide a measurement of the current I4 absorbed by the telecommunication apparatuses TA. Preferably, this fourth probe is provided only if the current I4 absorbed by the telecommunication apparatuses TA is not constant. However, in the following it is assumed that the current I4 absorbed by the telecommunication apparatuses I4 has a substantially constant value equal to I4*. Accordingly, the fourth probe could not be required.

The control device CD is connected to the probes p(i), p(ii) and p(iii) for receiving the measurements m(i), m(ii) and m(iii), respectively. Further, the control device CD is configured for receiving a load reduction signal S. The load reduction signal S may be transmitted to the control device CD either by an electrical transmission system operator e.g. through the mains Ms, or by the manager of the telecommunication site TS for reducing the current that the telecommunication site TS may draw from the mains Ms to a target value.

Further, the control device CD is connected to the energy station ES for providing it with a control signal Vc. Preferably, the control signal Vc is a voltage signal having e.g. an amplitude A included between 0 and 12 V. Alternatively, the control signal Vc may be either a current signal or a digital signal.

Preferably, the energy station ES is configured to implement the above mentioned external limitation technique. In other words, the energy station ES is configured to receive the control signal Vc from the control device CD, and to reduce the current I2 drawn from the mains Ms or the generator G through the switch SW by an amount proportional to the amplitude A of the control signal Vc. Accordingly, when the amplitude A of the control signal Vc is equal to 0, the current I2 is not limited, i.e. it exclusively depends on the current absorbed by the loads supplied by the energy station ES (i.e. the telecommunication apparatuses TA and, possibly, the battery B). When the amplitude A of the control signal Vc is increased, the energy station ES reduces the current I2. In particular, preferably, when the amplitude A of the control signal Vc is increased to its maximum value Amax (i.e. 10 or 12 V), the energy station ES preferably reduces the current I2 to a predefined value I2*, independently of the current required by the loads supplied by energy station ES (i.e. the telecommunication apparatuses TA and, possibly, the battery B).

Figure 2:
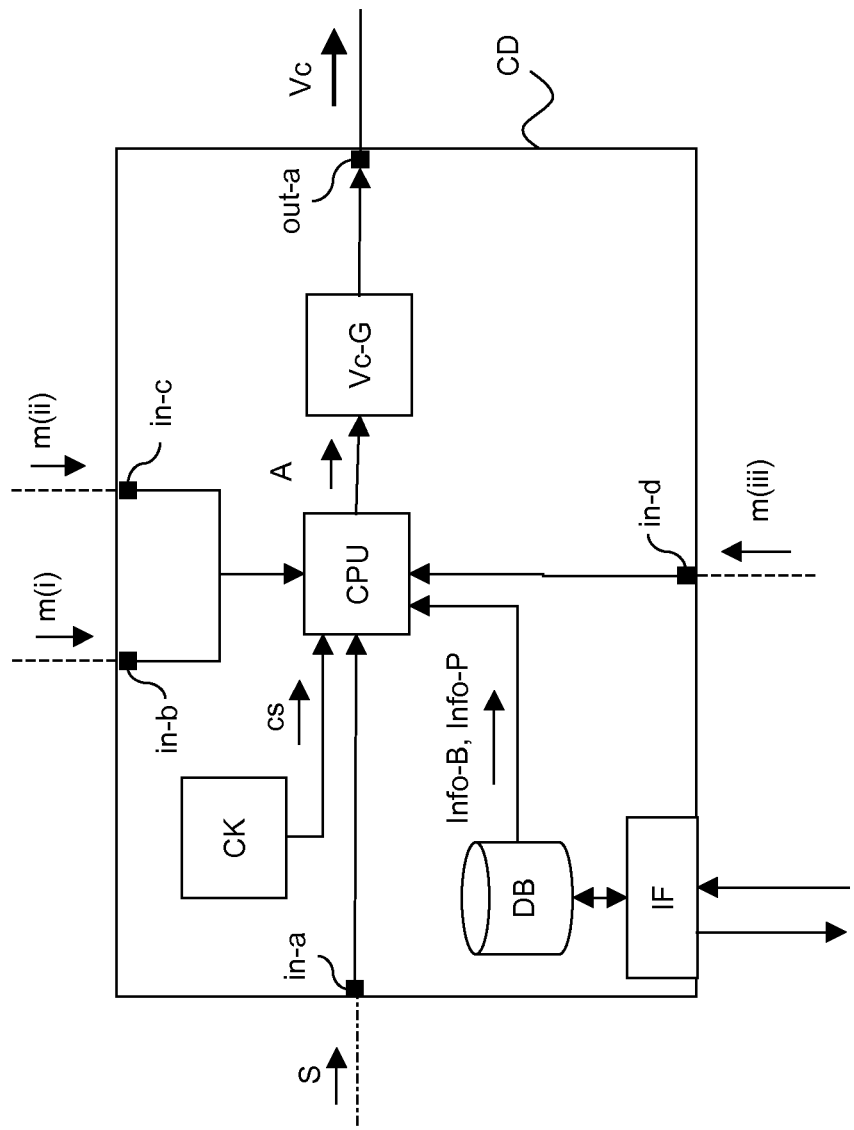
FIG. 2 shows in further detail the control device of FIG. 1.

FIG. 2 shows in further detail the structure of the control device CD. Preferably, the control device CD has a first input in-a suitable to receive the load reduction signal S. Further, the control device CD has three further inputs in-b, in-c and in-d which are suitable to receive the measurements m(i), m(ii) and m(iii) from the probes p(i), p(ii) and p(iii), respectively. Further, the control device CD has an output out-a connected to the energy station ES for providing the control signal Vc to the energy station ES.

The control device CD preferably comprises a clock module CK, a processor CPU, an interface IF, a database DB and a control signal generator Vc-G.

Preferably, the clock module CK is connected to the processor CPU. Preferably, the clock module CK is configured to generate a clock signal cs, which is preferably synchronized to the reference clock signal of the mains Ms, and to provide such a clock signal cs to the processor CPU.

Preferably, the database DB is configured to store price information InfoP indicative of the price per hour of the electrical energy and battery information InfoB relative to the battery B, as it will be described in further detail herein after.

Preferably, the interface IF is configured to allow exchange of information between a manager responsible of managing the electricity supply apparatus ESA and the control device CD. For instance, the manager may use the interface IF to request information about the status of the electricity supply apparatus ESA. Further, the manager may use the interface IF to load in the database DB possible updates of the price information InfoP and/or the battery information InfoB.

Preferably, the processor CPU is configured to receive the load reduction signal S, the clock signal cs from the clock module CK and the measurements m(i), m(ii) and m(iii) from the probes p(i), p(ii) and p(iii), respectively, to read the price information InfoP and the battery information InfoB from the database DB, and to calculate the amplitude A of the control signal Vc according to the clock signal cs, the measurements m(i), m(ii) and m(iii), the price information InfoP and the battery information InfoB, as it will be described herein after. Finally, the processor CPU is configured to transmit the calculated amplitude A to the control signal generator Vc-G.

Preferably, the control signal generator Vc-G is configured to receive the amplitude A from the processor CPU and to generate the control signal Vc with an amplitude A.

Preferably, the apparatus ESA further comprises a remote control board (not shown in the drawings) which is preferably managed by the control device CD, and which allows to perform various operations, such as forcing activation of the generator G, forcing inhibition of the control signal Vc, activation and deactivation of the energy station ES, test etc.

Herein after, the operation of the control device CD will be described in further detail.

According to preferred embodiments of the present invention, the control device CD is configured to classify each hour of a day as:
- a peak hour, if the price per hour of the electrical energy during that hour is higher than a maximum threshold;
- an off-peak hour, if the price per hour of the electrical energy during that hour is lower than a minimum threshold; or
- a neutral hour, if the price per hour of the electrical energy during that hour is comprised between the minimum threshold and the maximum threshold.

Figure 3:
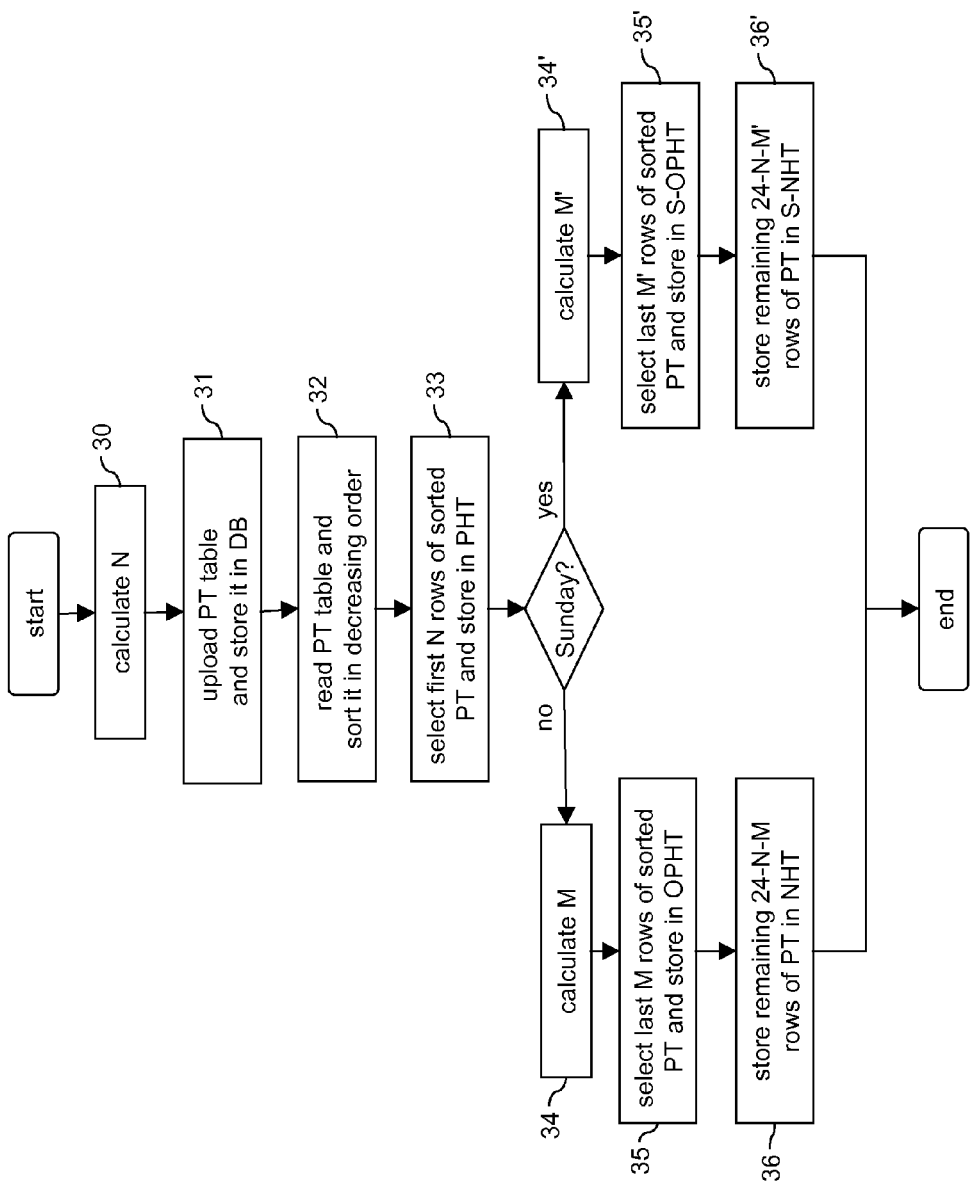
FIG. 3 is a flow chart showing the operation of classifying the hours of a day as peak hours, off-peak hours or neutral hours.

FIG. 3 is a flow chart showing in further detail the operation of classifying each hour of a day as a peak hour, an off-peak hour or a neutral hour, according to an embodiment of the present invention. Preferably, such an operation is performed once per day, in order to take into account daily variations of the electrical energy price.

During a first step 30, the control device CD calculates a number N of peak hours of the day. Preferably, the number N is calculated according to the battery information InfoB stored in the database DB. In particular, the battery information InfoB preferably comprise, inter alia, an optimum charge level BCLopt of the battery B (which may be equal e.g. to 80%), a minimum charge level BCLmin of the battery B (which may be equal e.g. to 30%) and an optimum discharge current I3opt− of the battery B. Preferably, the optimum charge level BCLopt is the maximum charge level allowing the battery B to store energy with a storage efficiency higher than a predetermined threshold. Besides, preferably, the minimum charge level BCLmin is the minimum charge level allowing the battery B to supply current to the telecommunication apparatuses TA for a predetermined time period, in case the energy station ES stops drawing current from the mains Ms and from the generator G. Preferably, the control device CD calculates the number N of peak hours of the day as the number of hours required to discharge the battery B from its optimum charge level BCLopt to its minimum charge level BCLmin with a discharge current equal to the optimum discharge current I3opt−.

During a second step 31, the control device CD preferably uploads a price table PT and stores it in its database DB. Preferably, the price table PT comprises 24 rows, and each row comprises an hour of the day and the price per hour of the electrical energy during that hour. Possibly, the price table PT is provided by an authority (e.g. a national authority) distributing the electrical energy through the mains Ms.

During a successive step 32, the processor CPU reads the price table PT and sorts the rows according to an increasing or decreasing order of the price per hour. In the following description, it is assumed by way of example that the rows of the price table PT are sorted according to a decreasing order of the price per hour. Accordingly, the first row of the sorted price table PT corresponds to the hour having the highest price per hour, while the last row corresponds to the hour having the lowest price per hour.

During a subsequent step 33, the processor CPU selects the first N rows of the sorted price table PT, and stores them in a peak hour table PHT.

Then, during a subsequent step 34, the processor CPU calculates a number M of off-peak hours of the day. Preferably, also the number M is calculated according to the battery information InfoB stored in the database DB. In particular, the battery information InfoB preferably comprise, inter alia, an optimum recharge current I3opt+ of the battery B. Preferably, the control device CD calculates the number M of off-peak hours of the day as the number of hours required to recharge the battery B from its minimum charge level BCLmin to its optimum charge level BCLopt with a recharge current equal to the optimum recharge current I3opt+.

Then, during a subsequent step 35, the processor CPU selects the last M rows of the sorted price table PT, and stores them in an off-peak hour table OPHT.

Then, during a subsequent step 36, the processor CPU selects the remaining 24-N-M rows of the sorted price table PT, and stores them in a neutral hour table NHT.

Preferably, the number of off-peak hours of a day (and therefore also the number of neutral hours of a day) depends on the day of the week. For instance, as shown in the flow chart of FIG. 3, the number M to be used from Monday to Saturday may be calculated as explained above, while on Sunday a further number M' of off-peak hours may be calculated (step 34'). Preferably, further number M' is higher than the number M. Preferably, also the further number M' is calculated according to the battery information InfoB stored in the database DB. In particular, the battery information InfoB preferably comprise, inter alia, a maximum charge level BCLmax of the battery B. Preferably, the control device CD calculates the further number M' of off-peak hours of the day as the number of hours required to recharge the battery B from its minimum charge level BCLmin to its maximum charge level BCLmax with a recharge current equal to the optimum recharge current I3opt+.

Then, during a subsequent step 35', the processor CPU selects the last M' rows of the sorted price table PT, and stores them in a Sunday off-peak hour table S-OPHT.

Then, during a subsequent step 36', the processor CPU selects the remaining 24-N-M' rows of the sorted price table PT, and stores them in a Sunday neutral hour table S-NHT.

Therefore, the price information InfoP stored in the database DB comprise the peak hour table PHT, the off-peak hour table OPHT, the neutral hour table NHT, the Sunday off-peak hour table S-OPHT and the Sunday neutral hour table S-NHT.

Figure 4:
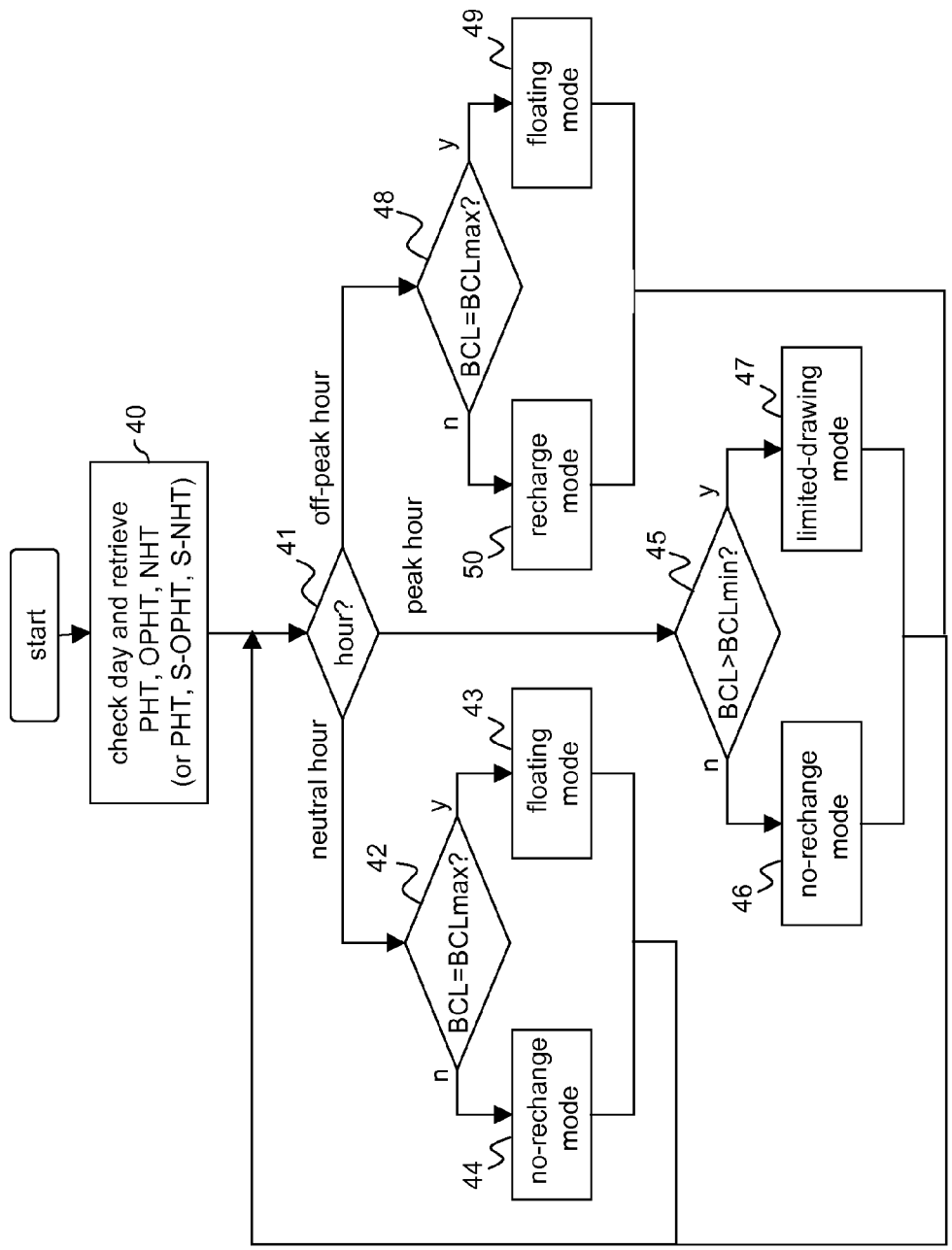
FIG. 4 is a flow chart of the operation of the control device of FIG. 2.

According to preferred embodiments of the present invention, the control device CD is configured to control the energy station ES by taking into account whether the present time is a peak hour, an off-peak hour or a neutral hour, as it will be now described in detail by referring to the flow chart of FIG. 4.

In FIG. 4, it is assumed that the control device CD is not receiving any load reduction signal S, i.e. the telecommunication site TS may draw a theoretically unlimited amount of current from the mains Ms. The generator G is inactive. Further, it is assumed that the telecommunication site TS is located either in Europe or in North America, where Sunday is the weekly holyday.

By referring to FIG. 4, when the control device CD is activated, it firstly checks the day of the week (step 40). If the day of the week is from Monday to Saturday, the control device CD preferably retrieves from its database DB the peak hour table PHT, the off-peak hour table OPHT and the neutral hour table NHT. Otherwise, if the day of the week is Sunday, the control device CD preferably retrieves from its database DB the peak hour table PHT, the Sunday off-peak hour table S-OPHT and the Sunday neutral hour table S-NHT.

Then, during a step 41, the control device CD preferably compares the clock signal cs generated by the clock module CK indicating the present time with the tables PHT, OPHT and NHT (or PTH, S-OPHT and S-NHT, if it is Sunday), thus determining whether the present time corresponds to a peak hour, an off-peak hour or a neutral hour. Preferably, step 41 is repeated once every period T. The period T preferably has a predefined duration, which may be equal e.g. to a some seconds .

Firstly, it is assumed that the present time corresponds to a neutral hour. During the neutral hours the energy station ES is preferably controlled so that the telecommunication apparatuses TA draw the current I4* only from the mains Ms (or from the generator G, if there is a blackout) and so that recharge of the battery B is prevented.

In particular, the control device CD checks the battery charge level BCL of the battery B according to the measurement m(ii) of the current I3 provided by the probe p(ii), and compares it with the maximum charge level BCLmax (step 42). Preferably, step 42 is repeated every T' seconds, T' being preferably lower than the duration of the period T. For instance, T' is equal to 5 seconds.

When the battery charge level BCL is equal to the maximum charge level BCLmax, the control device CD preferably keeps the energy station ES in a floating mode (step 43) by suitably regulating the amplitude A of the control signal Vc, as it will be described in further detail herein after. When the energy station ES is in its floating mode, the current I2 which the energy station ES draws from the mains Ms is not limited, and therefore it is determined by the current I4* absorbed only by the telecommunication apparatuses TA (since the battery B does not absorb any current). At the end of the period T, the control device CD performs again step 41.

Otherwise, when the battery charge level BCL is lower than the maximum charge level BCLmax, the control device CD preferably keeps the energy station ES in a no-recharge mode (step 44) by suitably regulating the amplitude A of the control signal Vc, as it will be described in further detail herein after. When the energy station ES is in its no-recharge mode, the current I2 which the energy station ES draws from the mains Ms is limited so that it is kept equal to the current I4* absorbed by the telecommunication apparatuses TA, thus preventing the battery B to absorb any current I3, and therefore preventing the battery B from increasing its battery charge level BCL. At the end of the period T, the control device CD performs again step 41.

It is now assumed that the present time corresponds to a peak hour. During the peak hours, the energy station ES is preferably controlled so that the telecommunication apparatuses TA draw at least part of the current I4* from the battery B and so that recharge of the battery B is prevented.

In particular, the control device CD checks the battery charge level BCL of the battery B according to the measurement m(ii) of the current I3 provided by the probe p(ii), and compares it with the minimum charge level BCLmin (step 45). Preferably, also step 45 is repeated every T' seconds, T' being preferably lower than the duration of the period T. For instance, T' is equal to 5 seconds.

When the battery charge level BCL is lower than the minimum charge level BCLmin, the control device CD preferably keeps the energy station ES in the no-recharge mode (step 46) by suitably regulating the amplitude A of the control signal Vc, as it will be described in further detail herein after. As mentioned above, when the energy station ES is in its no-recharge mode, the current I2 which the energy station ES draws from the mains Ms is limited so that it is kept equal to the current I4* absorbed by the telecommunication apparatuses TA, thus preventing the battery B to absorb any current I3 and therefore preventing the battery B from increasing its battery charge level BCL. At the end of the period T, the control device CD performs again step 41.

Otherwise, when the battery charge level BCL is higher than the minimum charge level BCLmin, the control device CD preferably keeps the energy station ES in a limited-drawing mode (step 47) by suitably regulating the amplitude A of the control signal Vc, as it will be described in further detail herein after. When the energy station ES is in its limited-drawing mode, the current I2 which the energy station ES draws from the mains Ms is decreased, so that the telecommunication apparatuses TA start drawing at least part of the current I4* from the battery B. The battery B then reduces its battery charge level BCL. At the end of the period T, the control device CD performs again step 41.

It is now assumed that the present time corresponds to an off-peak hour. During the off-peak hours, the energy station ES is preferably controlled so that the telecommunication apparatuses TA draw the current I4* only from the mains Ms (or from the generator G, if there is a blackout) and so that recharge of the battery B is allowed.

In particular, the control device CD checks the battery charge level BCL of the battery B according to the measurement m(ii) of the current I3 provided by the probe p(ii), and compares it with the maximum charge level BCLmax (step 48). Preferably, step 48 is repeated every T' seconds, T' being preferably lower than the duration of the period T. For instance, T' is equal to 5 seconds.

When the battery charge level BCL is equal to the maximum charge level BCLmax, the control device CD preferably keeps the energy station ES in the floating mode (step 49) by suitably regulating the amplitude A of the control signal Vc, as it will be described in further detail herein after. As mentioned above, when the energy station ES is in its floating mode, the current I2 which the energy station ES draws from the mains Ms is not limited, and therefore it is determined by the current I4* absorbed only by the telecommunication apparatuses TA (the battery B does not absorb any current). At the end of the period T, the control device CD performs again step 41.

Otherwise, when the battery charge level BCL is lower than the maximum battery charge level BCLmax, the control device CD preferably keeps the energy station ES in a recharge mode (step 50) by suitably regulating the amplitude A of the control signal Vc, as it will be described in further detail herein after. When the energy station ES is in its recharge mode, the current I2 which the energy station ES draws from the mains Ms is increased, so that it can be absorbed partially by the telecommunication apparatuses TA and partially by the battery B. The battery B then increases its charge level BCL. At the end of the period T, the control device CD performs again step 41.

According to preferred embodiments of the present invention, if the control device CD receives a load reduction signal S indicating that the current that the telecommunication site TS may draw from the mains Ms has to be reduced to a target value, the control device CD preferably performs the following operation, independently of whether the present time corresponds to a peak hour, an off-peak hour or a neutral hour. Firstly, it preferably checks whether the battery charge level BCL is higher than the minimum battery charge level BCLmin. In the affirmative, the control device CD preferably keeps the energy station ES in the above mentioned limited-drawing mode, so that the telecommunication apparatuses TS start drawing current from the battery B. In the negative, the control device CD preferably switches on the generator G and switches status of the mains-generator switch SW, so that the telecommunication site TS may start drawing current from the generator G. In this situation, the control device CD preferably brings the energy station in the above mentioned no-recharge mode. In this way, the current drawn by the energy station ES from the generator G is supplied only to the telecommunication apparatuses TA, thus postponing the recharge of the battery B to an off-peak hour during which the normal operation of the mains Ms will be restored.

When the control device CD stops receiving the load reduction signal S, the control device preferably performs again step 41.

By referring to FIGS. 5a and 5b, the operation of the electricity supply apparatus ESA during the above steps 43 and 44, respectively, will be described in detail.

Figure 5B:
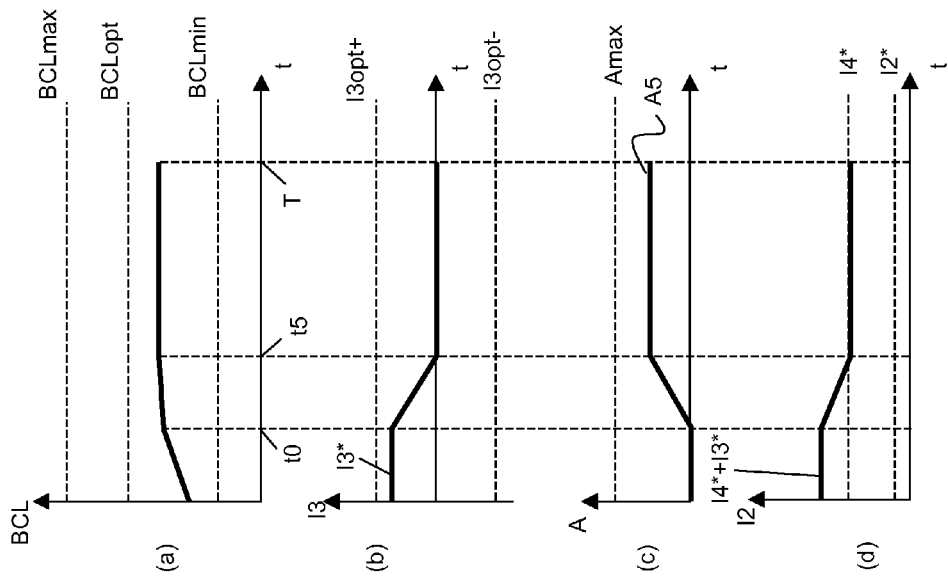
FIGS. 5a and 5b schematically show the operation of the electricity supply apparatus of FIG. 1 during a neutral hour, when the battery is fully charged and partially charged, respectively, FIGS. 6a and 6b schematically show the operation of the electricity supply apparatus of FIG. 1 during a peak hour, when the battery charge level is lower and higher of a minimum charge level, respectively.
Figure 5A:
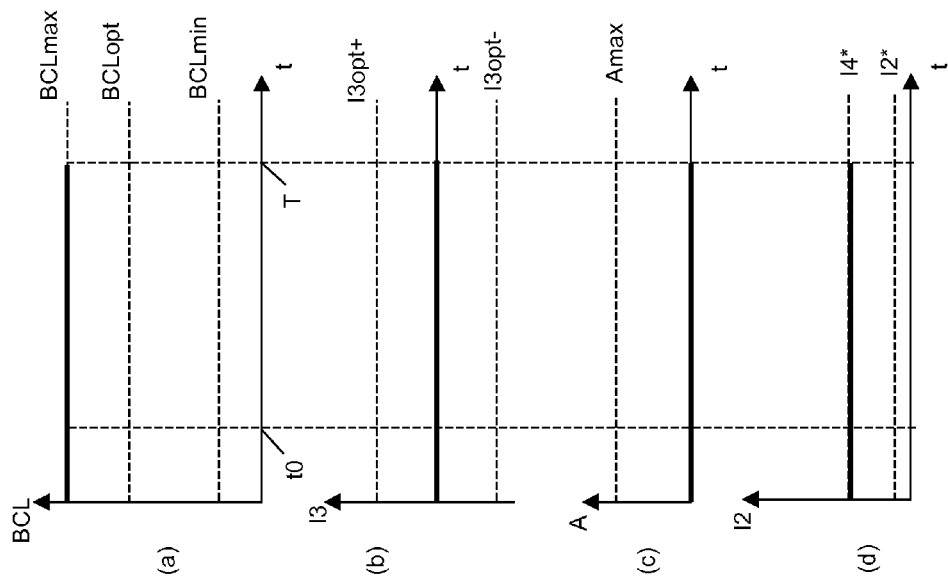

Each of the FIGS. 5a and 5b shows the battery charge level BCL (graph (a)), the current I3 absorbed by the battery B (graph (b)), the amplitude A of the control signal Vc (graph (c)) and the current I2 drawn by the energy station ES from the mains Ms (graph (d)) versus time, during a period T. The graphs of the FIGS. 5a and 5b are not in scale.

By firstly referring to FIG. 5a, graph (a) shows that when the battery charge level BCL is equal to the maximum charge level BCLmax (for instance 100%), the battery B does not absorb any current, i.e. I3=0, as shown by graph (b). Accordingly, the current I2 that the energy station ES draws from the mains Ms is equal to the current I4* absorbed by the telecommunication apparatuses TA (as mentioned above, it is assumed that the conversion efficiency of the energy station ES is equal to 1). At the beginning of the period T (i.e. at the time t0), when the control device CD realizes that the present time corresponds to a neutral hour and the battery charge level BCL is equal to the maximum charge level BCLmax, it preferably keeps the amplitude A of the control signal Vc equal to 0, so that the current I2 is not limited (floating mode). The amplitude A is preferably kept equal to 0 until the end of the period T, as shown in graph (c).

By referring now to FIG. 5b, graph (a) shows that when the battery charge level BCL is lower than the maximum charge level BCLmax, the battery B absorbs a current I3*, as shown by graph (b), thus increasing its battery charge level BCL. Accordingly, the current I2 that the energy station ES draws from the mains Ms is equal to the current I4* absorbed by the telecommunication apparatuses TA summed to the current I3* absorbed by the battery B (as mentioned above, it is assumed that the conversion efficiency of the energy station ES is equal to 1). At the beginning of the period T (i.e. at the time t0), when the control device CD realizes that the present time corresponds to a neutral hour and the battery charge level BCL is lower than the maximum charge level BCLmax, it preferably starts increasing the amplitude A of the control signal Vc as shown in graph (c), thus decreasing the current I2. Even though in FIG. 5b the amplitude A gradually increases in a substantially linear way, this is merely exemplary. Indeed, the amplitude A may be gradually increased in other ways, such as exponential, parabolic and so on. Further, the amplitude A may be varied step-by-step.

Since the telecommunication apparatuses TA always absorb the same current I4*, the current I3 absorbed by the battery B starts decreasing. Preferably, the control device CD increases the amplitude A of the control signal Vc until, at a time t5, it reaches a value A5 comprised between 0 and Amax. Preferably, the value A5 is such that the current I2 drawn by the energy station ES is again equal to I4*, and therefore the current I3 absorbed by the battery B is equal to 0, so that the battery B stops recharging (no-recharge mode). From t5 to the end of the period T, the amplitude A is preferably kept constant to A5, so that the current I2 is kept constant to I4*, the current I3 is kept constant to 0, and the battery charge level BCL is kept substantially constant.

By referring to FIGS. 6a and 6b, the operation of the electricity supply apparatus ESA during the above steps 46 and 47, respectively, will be described in detail.

Figure 6A:
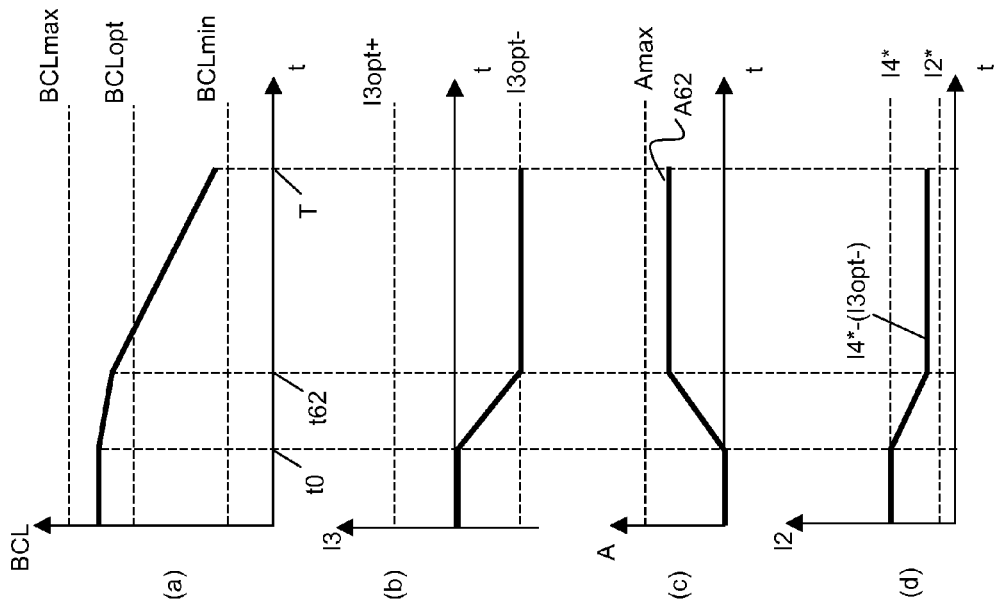
Figure 6B:
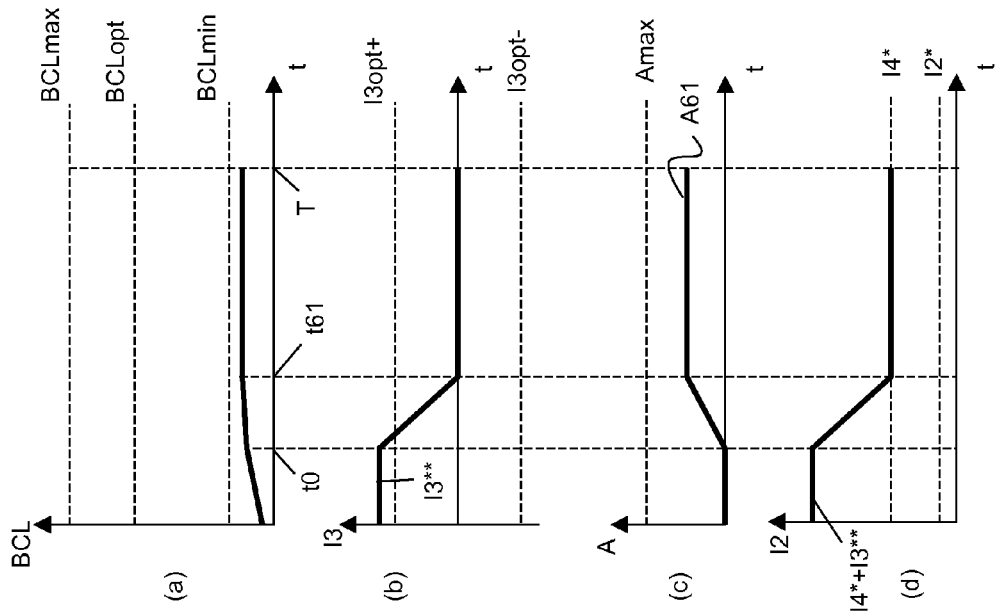

Each of the FIGS. 6a and 6b shows the battery charge level BCL (graph (a)), the current I3 absorbed by the battery B (graph (b)), the amplitude A of the control signal Vc (graph (c)) and the current I2 drawn by the energy station ES from the mains Ms (or from the generator G) (graph (d)) versus time, during a period T. The graphs of the FIGS. 6a and 6b are not in scale.

By referring first to FIG. 6a, graph (a) shows that when the battery charge level BCL is lower than the minimum charge level BCLmin, the battery B absorbs a current I3**, as shown by graph (b), thus increasing its battery charge level BCL. Accordingly, the current I2 that the energy station ES draws from the mains Ms is equal to the current I4* absorbed by the telecommunication apparatuses TA summed to the current I3 absorbed by the battery B (as mentioned above, it is assumed that the conversion efficiency of the energy station ES is equal to 1). At the beginning of the period T (i.e. at the time t0**), when the control device CD realizes that the present time corresponds to a peak hour and the battery charge level BCL is lower than the minimum charge level BCLmin, it preferably starts increasing the amplitude A of the control signal Vc as shown in graph (c), thus starting decreasing the current I2. Even though in FIG. 6a the amplitude A gradually increases in a substantially linear way, this is merely exemplary. Indeed, the amplitude A may be gradually increased in other ways, such as exponential, parabolic and so on. Further, the amplitude A may be varied step-by-step.

Since the telecommunication apparatuses TA always absorb the same current I4*, the current I3 absorbed by the battery B starts decreasing. Preferably, the control device CD increases the amplitude A of the control signal Vc until, at a time t61, it reaches a value A61 comprised between 0 and Amax. Preferably, the value A61 is such that the current I2 drawn by the energy station ES is again equal to I4*, and therefore the current I3 absorbed by the battery B is equal to 0, so that the battery B stops recharging (no-recharge mode). From t61 to the end of the period T, the amplitude A is preferably kept constant to the value A61, so that the current I2 is kept constant to I4*, the current I3 is kept constant to 0, and the battery charge level BCL is kept substantially constant.

By referring now to FIG. 6b, graph (a) shows by way of example that the battery charge level BCL before the period T is very close to the maximum charge level BCLmax, so that the battery B substantially does not absorb any current, i.e. I3=0, as shown in graph (b). Accordingly, the current I2 drawn by the energy station ES from the mains Ms is substantially equal to the current I4* absorbed by the telecommunication apparatuses TA, and the amplitude A of the control signal Vc is equal to zero. At the beginning of the period T (i.e. at the time t0), when the control device CD realizes that the present time corresponds to a peak hour and the battery charge level BCL is higher than the minimum charge level BCLmin, it preferably starts increasing the amplitude A of the control signal Vc as shown in graph (c), thus starting decreasing the current I2. Even though in FIG. 6b the amplitude A gradually decreases in a substantially linear way, this is merely exemplary. Indeed, the amplitude A may be gradually decreased in other ways, such as exponential, parabolic and so on. Further, the amplitude A may be varied step-by-step.

Since the telecommunication apparatuses TA always absorb the same current I4*, they start drawing current from the battery B, as indicated in graph (b) by the fact that I3 starts assuming negative values (limited-drawing mode). Accordingly, the battery charge level BCL starts decreasing, as shown in graph (a). Preferably, the control device CD increases the amplitude A of the control signal Vc until, at a time t62, it reaches a value A62 comprised between 0 and Amax. Preferably, the value A62 is such that one of the two following conditions occurs:

i) the current I3 increases in absolute value until it becomes equal to the optimum discharge current I3opt− of the battery B. In this case, the current I2 drawn by the energy station ES from the mains Ms is equal to I4* reduced by the absolute value of I3opt−; or ii) the current I2 decreases until it becomes equal to I2* which, as mentioned above, is the predefined value of the current I2 when the amplitude A of the control signal Vc has its maximum value Amax.

Therefore, if the current I3 fulfils the condition i) before the current I2 fulfils the condition ii), the telecommunication apparatuses TA draw a current I3opt− from the battery B and a current I4*−(I3opt−) from the energy station ES. FIG. 6b shows this situation. If, otherwise, the current I2 fulfils the condition ii) before the current I3 fulfils the condition i), the telecommunication apparatuses TA draw a current I2* from the energy station ES and a current I4*−I2* from the battery B.

From t62 to the end of the period T, the amplitude A is preferably kept constant to the value A62, so that the currents I2 and I3 are kept substantially constant, and the battery charge level BCL continues to decrease.

If, before the end of the period T, the battery charge level BCL reaches the minimum battery charge level BCLmin (this case is not shown in FIG. 6b), the control device CD preferably forces the energy station ES into its no-recharge mode by decreasing the amplitude A of the control signal Vc, so that the current I2 increases again. Preferably, the amplitude A of the control signal Vc is increased until the current I2 is again equal to the current I4* absorbed by the telecommunication apparatuses TA. Therefore, the telecommunication apparatuses TA draw again the current I4* only from the energy station ES, while the battery B neither supplies nor draws any current (I3=0), thus keeping its battery charge level BCL constant.

By referring to FIGS. 7a and 7b, the operation of the electricity supply apparatus ESA during the above steps 49 and 50, respectively, will be described in detail.

Figure 7B:
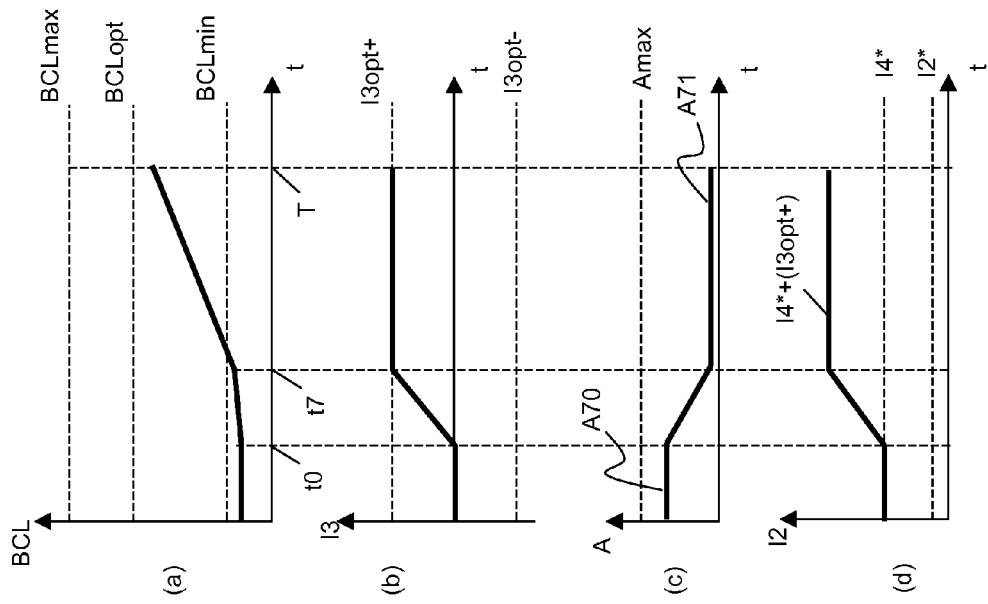
FIGS. 7a and 7b schematically show the operation of the electricity supply apparatus of FIG. 1 during an off-peak hour, when the battery is fully charged and partially charged, respectively.
Figure 7A:
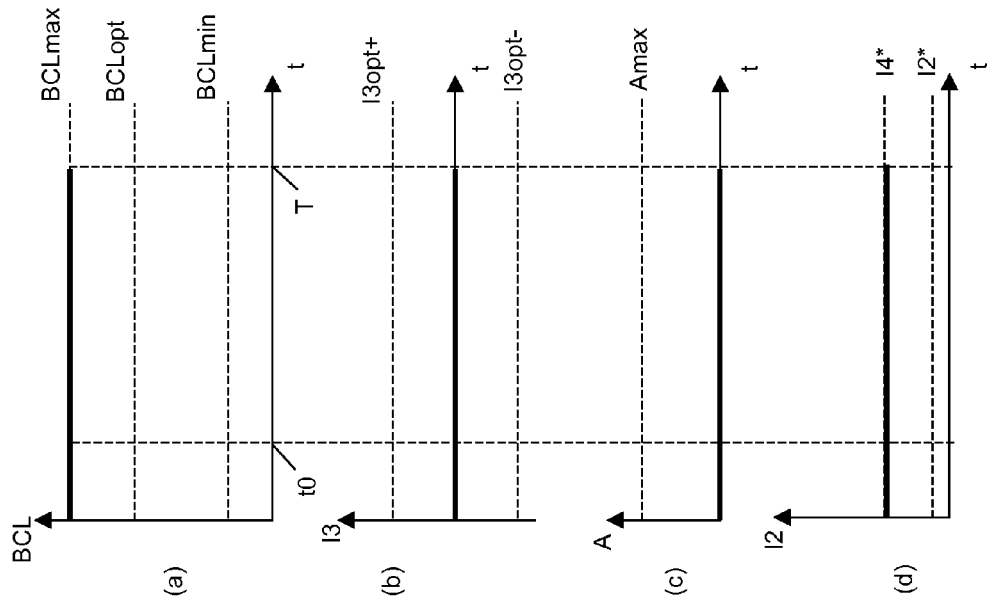

Each of the FIGS. 7a and 7b show the battery charge level BCL (graph (a)), the current I3 absorbed by the battery B (graph (b)), the amplitude A of the control signal Vc (graph (c)) and the current I2 drawn by the energy station ES from the mains Ms (or from the generator G, if there is a blackout) (graph (d)) versus time, during a period T. The graphs of the FIGS. 7a and 7b are not in scale. By referring first to FIG. 7a, graph (a) shows that when the battery charge level BCL is equal to the maximum charge level BCLmax (for instance 100%), the battery B does not absorb any current, i.e. I3=0, as shown by graph (b). Accordingly, the current I2 that the energy station ES draws from the mains Ms is equal to the current I4* absorbed by the telecommunication apparatuses TA (as mentioned above, it is assumed that the conversion efficiency of the energy station ES is equal to 1). At the beginning of the period T (i.e. at the time t0), when the control device CD realizes that the present time corresponds to an off-peak hour and the battery charge level BCL is equal to the maximum charge level BCLmax, it preferably keeps the amplitude A of the control signal Vc equal to 0, so that the current I2 is not limited (floating mode). The amplitude A is preferably kept equal to 0 until the end of the period T, as shown in graph (c).

By referring now to FIG. 7b, it is assumed that, before the period T, the energy station ES is in its no-recharge mode, for instance because it is a peak hour and the battery charge level BCL of the battery B is lower than the minimum charge level BCLmin (see FIG. 6a). In this no-recharge mode, as explained above, the control device CD keeps the amplitude A of the control signal Vc substantially constant to a value A70 such that the current I2 that the energy station ES draws from the mains Ms is equal to the current I4* absorbed by the telecommunication apparatuses TA and the current I3 absorbed by the battery B is equal to zero, so that the battery charge level BCL is substantially constant. At the beginning of the period T (i.e. at the time t0), when the control device CD realizes that the present time corresponds to an off-peak hour and the battery charge level BCL is lower than the maximum battery charge level BCLmax, it preferably starts to decrease the amplitude A of the control signal Vc, so that the current I2 starts increasing. Even though in FIG. 7b the amplitude A gradually decreases in a substantially linear way, this is merely exemplary. Indeed, the amplitude A may be gradually decreased in other ways, such as exponential, parabolic and so on. Further, the amplitude A may be varied step-by-step.

Accordingly, since the telecommunication apparatuses TA always absorb the current I4*, the current supplied by the energy station ES and which is not absorbed by the telecommunication apparatuses TA is absorbed by the battery B, which then starts recharging (recharge mode). Preferably, the control device CD decreases the amplitude A until a time t7, wherein it reaches a value A71 lower than A70, which is also preferably comprised between 0 and Amax. Preferably, the value A71 is such that the current I3 absorbed by the battery B is equal to the optimum recharge current I3opt+, i.e. until the current I2 is equal to I4*+(I3opt+). From t7 until the end of the period T, the control device DC keeps the amplitude A of the control signal Vc constant to the value A71, so that the current is kept equal to I3opt+ and the current I2 is kept equal to I4*+(I3opt+) thus increasing the battery charge level BCL. If, before the end of the period T, the battery charge level BCL reaches the maximum charge level BCLmax (this case is not shown in FIG. 7b), the control device CD preferably forces the energy station ES into its floating mode by decreasing the amplitude A of the control signal Vc to zero. Therefore, the current I2 gradually stops being limited and, since the battery B does not absorb any current (I3=0), I2 is determined only by the current I4* absorbed by the telecommunication apparatuses TA.

If, before the end of the period T, the battery charge level BCL reaches the optimum battery charge level BCLopt (this case is not shown in FIG. 7b), the control device CD preferably may force the energy station ES into its no-recharge mode by decreasing the amplitude A of the control signal Vc until I2 is equal to I4*, so that the battery B stops absorbing current (I3=0) even if it is not fully charged.

Therefore, advantageously, thanks to the fact that the current I2 that the energy station ES draws from the mains Ms is varied by varying the amplitude A both according to the price information InfoP and according to the battery information InfoB, the current drawn by the electricity supply apparatus ESA during the peak hours can be minimized, while allowing to discharge and recharge the battery B according to the optimum operating conditions of the battery B. Indeed, advantageously, during the off-peak hours, the amplitude A of the control signal Vc may be adjusted until the current I3 that the battery B absorbs from the energy station ES is equal to the optimum recharge current I3opt+. By further adjusting the amplitude A, it is also possible to prevent the battery B from being recharged above its optimum charge level BCLopt. Besides, during the peak hours, the amplitude A of the control signal Vc may be adjusted until the current I3 that the battery B supplies to the telecommunication apparatuses TA is equal to the optimum discharge current I3opt−. By further adjusting the amplitude A it is also possible to prevent the battery B from being discharged below its minimum value. In other words, discharge and recharge of the battery B may be performed in a controlled way, by adapting the behaviour of the energy station ES in order to allow the battery B to operate in its optimum conditions.

This advantageously allows to maximize the storage efficiency of the battery and to reduce aging of the battery due to repeated discharge and recharge operations.

Further, when the battery B is replaced with a battery of another type, new battery information InfoB may be uploaded in the database DB of the electricity supply apparatus ESA. The processor CPU will advantageously use such new battery information InfoB for adapting the behaviour of the energy station ES so that discharge and recharge are always performed under optimum conditions of the new battery.

Further, advantageously, thanks to the fact that the current I2 that the energy station ES drawn from the mains Ms is gradually varied (either in a continuous way as shown in FIGS. 5a, 5b, 6a, 6b, 7a and 7b, or step-by-step) by gradually varying the amplitude A of the control signal Vc, surges that could damage the battery B or the apparatuses TA and EA are avoided. Indeed, the gradual increase or decrease of the amplitude A of the control signal Vc allows to provide smooth transients between the various modes (floating, no-recharge, recharge or limited-drawing) of the electricity station ES, thus gradually varying both the current I4 absorbed by the telecommunication apparatuses TA and the current I3 absorbed by the battery B.

Although in the embodiment shown in FIG. 1 the control device CD is configured to control a single energy station ES, according to other embodiments not shown in the drawings a single control device CD may control more than one energy station ES. To this purpose, for each electrical station the control device comprises separated inputs for collecting the measurements m(i), m(ii), m(iii) and a separate output for providing a respective control signal Vc. This advantageously allows the control device CD to control each energy stations ES in an independent way. For instance, during an off-peak hour, a first energy station may be kept in its floating mode since its batteries are completely charged, while a second energy station may be kept in its recharge mode since its batteries are not completely charged.

In addition to the above functions, the control device is preferably configured to perform also the following operations.

First of all, when the generator G is activated (e.g. during a blackout), the control device CD preferably varies the amplitude A of the control signal Vc in order to optimise its efficiency either by reducing the current I1 drawn from the generator G (and therefore supplying the telecommunication apparatuses TA at least partially by means of the battery B) or by increasing the current I1 both for supplying the telecommunication apparatuses TA and for recharging the battery B.

Besides, the control device CD may be operated in order to implement an external limitation function similar to the above mentioned known external limitation technique. However, differently from the known external limitation technique, which only provides for two fixed thresholds of maximum currents which can be drawn either from the mains Ms or from the generator G, the external limitation function implemented by the control device CD according to embodiments of the present invention advantageously allows to vary the thresholds. In other words, a number of thresholds may be provides, wherein the number of thresholds and the value of each threshold can be adjusted according to the day of the week, the hour of the day, etc.

The invention claimed is:

1. An electricity supply apparatus of an industrial site comprising a load configured to draw a predetermined current, said electricity supply apparatus comprising:
   a control device capable of being configured to calculate an amplitude of a control signal according to price information indicative of a price per time unit of a first current drawn from a mains and to generate said control signal;
   an energy station capable of being configured to draw said first current from said mains to provide at least a first part of said first current to said load, to receive said control signal from said control device, and to reduce said first current by an amount proportional to said amplitude of said control signal; and
   a battery electrically connected to said energy station and to said load, said battery capable of being configured to, when said first current drawn by said energy station from said mains is greater than said predetermined current which said load is configured to draw, recharge by drawing a second part of said first current from said energy station and, when said first current drawn by said energy station from said mains is smaller than said predetermined current which said load is configured to draw, to discharge by providing a second current to said load, wherein said control device is capable of being further configured to calculate said amplitude of said control signal also according to battery information relating to at least one of a recharge condition and a discharge condition of said battery, said amplitude having an intermediate value of a range delimited by a minimum value and a maximum value.

2. The apparatus according to claim 1, wherein said price information comprises a price table, said price table comprising a number of rows, each of said number of rows comprising an hour of the day and a price per hour of said first current during said hour.

3. The apparatus according to claim 2, wherein said control device is further configured to classify each hour in said price table as one of a peak hour, a neutral hour and an off-peak hour, according to said battery information.

4. The apparatus according to claim 3, wherein said battery information comprises an optimum charge level of said battery, a minimum charge level of said battery and an optimum discharge current of said battery.

5. The apparatus according to claim 4, wherein said control device is capable of being configured to determine a first number N of peak hours as a number of hours required to discharge said battery from said optimum charge level to said minimum charge level with a discharge current equal to said optimum discharge current.

6. The apparatus according to claim 5, wherein said battery information further comprises an optimum recharge current of said battery.

7. The apparatus according to claim 6, wherein said control device is capable of being further configured to determine a second number M of off-peak hours as a number of hours required to recharge said battery from said minimum charge level to said optimum charge level with a recharge current equal to said optimum recharge current.

8. The apparatus according to claim 7, wherein said control device is capable of being configured to determine a third number of neutral hours according to a formula: 24-N-M.

9. The apparatus according to claim 6, wherein said second number is a function of the day of the week.

10. The apparatus according to claim 3, wherein said control device is capable of being configured to detect a present time and to determine whether said present time corresponds to a peak hour, or to an off-leak hour or to a neutral hour.

11. The apparatus according to claim 10, wherein said control device is capable of being further configured, if said present time corresponds to a neutral hour, to detect a present battery charge level, to determine whether said present battery charge level is equal to a maximum charge level of said battery, and:

in the affirmative, to set said amplitude to said minimum value; and in the negative, to set said amplitude to a first intermediate value such that said first current is equal to a current requested by said load, said second part of said first current being equal to zero.

12. The apparatus according to claim 11, wherein said control device is capable of being further configured, if said present time corresponds to a peak hour, to detect said present battery charge level, to determine whether said present battery charge level is higher than said minimum battery charge level of said battery, and:

in the affirmative, to set said amplitude to a second intermediate value such that said first current is equal to said current requested by said load decreased by said optimum discharge current of said battery, said battery being discharged with said second current equal to said optimum discharge current; and in the negative, to set said amplitude to a third intermediate value such that said first current is equal to said current requested by said load, said second current being equal to zero.

13. The apparatus according to claim 11, wherein said control device is capable of being further configured, if said present time corresponds to an off-peak hour, to detect said present battery charge level, to determine whether said present battery charge level is equal to said maximum battery charge level of said battery, and:

in the affirmative, to set said amplitude to said minimum value; and in the negative, to set said amplitude to a fourth intermediate value such that said first current is equal to said current requested by said load increased by said optimum recharge current of said battery, said battery recharging with said second part of said first current equal to said optimum recharge current.

14. The apparatus according to claim 11, wherein said control device is capable of being further configured to:

detect whether said control device is receiving a load reduction signal;

in the affirmative, determine whether said present battery charge level is higher than said minimum battery charge level of said battery, and:

in the affirmative, set said amplitude to one of said minimum value and a fifth intermediate value, such that said first current is reduced to a target value; and in the negative, activate a generator and instruct said energy station to start drawing said first current from said generator.

15. A method for supplying an industrial site comprising a load configured to draw a predetermined current, by means of an energy station, comprising:

a) at said energy station, drawing a first current from a mains by means of said energy station and providing at least part of said first current to said load;

b) at a control device, calculating an amplitude of a control signal according to price information indicative of a price per time unit of said first current and providing said control signal to said energy station;

c) at said energy station, receiving said control signal and reducing said first current by an amount proportional to said amplitude of said control signal; and d) when said first current drawn by said energy station from said mains is greater than said predetermined current which said load is configured to draw, recharging a battery electrically connected to said energy station and to said load with a second part of said first current and, when said first current drawn by said energy station from said mains is smaller than said predetermined current which said load is configured to draw, discharging said battery by providing a second current to said load, wherein step b) comprises calculating said amplitude of said control signal also according to battery information relating to at least one of a recharge condition and a discharge condition of said battery, said amplitude having an intermediate value of a range delimited by a minimum value and a maximum value.

16. The method according to claim 15, further comprising, before step b), receiving said price information in a form of a price table, said price table comprising a number of rows, each of said number of rows comprising an hour of the day and a price per hour of said first current during said hour.

17. The method according to claim 16, further comprising, before step b), classifying each hour in said price table as one of a peak hour, a neutral hour and an off-peak hour, according to said battery information.

18. The method according to claim 17, further comprising, before step b), determining a first number N of peak hours as a number of hours required to discharge said battery from an optimum charge level to a minimum charge level with a discharge current equal to an optimum discharge current.

19. The method according to claim 18, further comprising, before step b), determining a second number M of off-peak hours as a number of hours required to recharge said battery from said minimum charge level to said optimum charge level with a recharge current equal to an optimum recharge current.

20. The method according to claim 19, further comprising before step b), determining a third number of neutral hours according to formula: 24-N-M.

21. The method according to claim 20, wherein step b) comprises detecting a present time and determining whether said present time corresponds to a peak hour, or to an off-peak hour or to a neutral hour.

22. The method according to claim 21, wherein step b) comprises, if said present time corresponds to a neutral hour, detecting a present battery charge level, determining whether said present battery charge level is equal to a maximum charge level of said battery, and:
   in the affirmative, setting and amplitude to said minimum value; and
   in the negative, setting said amplitude to a first intermediate value such that said first current is equal to a current requested by said load, said second part of said first current being equal to zero.

23. The method according to claim 22, wherein step b) comprises, if said present time corresponds to a peak hour, detecting said present battery charge level, determining whether said present battery charge level is higher than said minimum battery charge level of said battery, and:
   in the affirmative, setting said amplitude to a second intermediate value such that said first current is equal to said current requested by said load decreased by said optimum discharge current of said battery, said battery being discharged with said second current equal to said optimum discharge current; and
   in the negative, setting said amplitude to a third intermediate value such that said first current is equal to said current requested by said load, and second current being equal to zero.

24. The method according to claim 22, wherein step b) comprises, if said present time corresponds to an off-peak hour, detecting said present battery charge level, determining whether said present battery charge level is equal to said maximum battery charge level of said battery, and:
   in the affirmative, setting said amplitude to said minimum value; and
   in the negative, setting said amplitude to a fourth intermediate value such that said first current is equal to said current requested by said load increased by said optimum recharge current of said battery, said battery recharging with said second part of said first current equal to said optimum recharge current.

25. The method according to claim 22, wherein step b) further comprises:
   detecting whether a load reduction signal is received;
   in the affirmative, determining whether said present battery charge level is higher than said minimum battery charge level of said battery, and:
      in the affirmative, setting said amplitude to one of said minimum value and a fifth intermediate value, such that said first current is reduced to a target value; and
      in the negative, activating a generator and instructing said energy station to start drawing said first current from said generator.

* * * * *